Patented Dec. 3, 1935

2,022,935

UNITED STATES PATENT OFFICE 2,022,935

ASYMMETRICAL UREAS AND THEIR PRODUCTION

Josef Hilger, Cologne-Mulheim, and Carl Taube, Leverkusen-Wiesdorf, Germany, assignors to General Aniline Works, Inc., New York, N. Y., a corporation of Delaware No Drawing. Application March 16, 1932, Serial No. 599,344. In Germany March 19, 1931

8 Claims. (Cl. 260—96)

The present invention relates to a process of preparing new asymmetrical ureas and to the new compounds obtainable thereby, more particularly it relates to compounds which may be represented by the probable general formula:

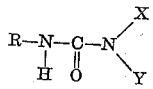

wherein R stands for the radical of an aminoazo-compound free from a free carboxylic acid or a free sulfonic acid group, but in which the nuclei may be otherwise substituted, for example by alkyl, hydroxy-alkyl, halogen, the hydroxy group, an alkoxy group, the nitro group or an esterified carboxylic acid group, and X stands for hydrogen or alkyl and Y stands for radicals of the benzene or naphthalene series.

Our new products are obtainable by causing an isocyanate of an aminoazo-compound free from a free carboxylic acid or a free sulfonic acid group and ammonia or a primary or secondary amine of the aliphatic, aromatic or aliphaticaromatic series, to act upon each other in a solvent.

The process is favorably carried out by working with about molecular quantities of the two reacting components; the temperatures required somewhat depend on the specific components used, but as a general rule it may be stated that the process can be performed at temperatures between about 30° C. and about 100° C. In this connection it is to be said that due to the evolution of heat produced in the exothermic reaction, in some cases the process can be performed without heating.

In case both components are free from a free sulfonic or carboxylic acid group, there are advantageously used inert organic liquids as solvents, such as benzene, chlorobenzene, nitrobenzene, while water is a suitable solvent in case the amine used contains a free sulfonic or carboxylic acid group in its molecule, the sulfonic or carboxylic acids being dissolved in the water in the form of their alkali metal salts.

The azoisocyanates used as starting components in our process are obtainable by causing phosgene to act on an amino-azo compound containing no free sulfonic acid or carboxylic acid group or on a salt of an amino-azo compound of the kind referred to with an indifferent volatile acid, such as hydrochloric acid, at increasing temperatures, the final temperature not exceeding 100° C. These azo isocyanates and the process of their manufacture have been described in U. S. Patent 1,916,314.

The amino isocyanates coming into consideration for the purpose of our invention hereafter are illustrated by the formulæ of some types.

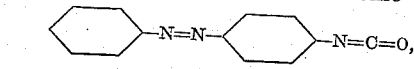

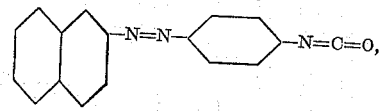

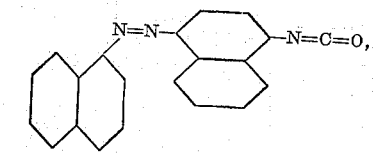

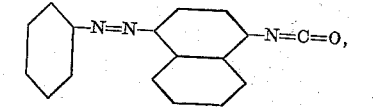

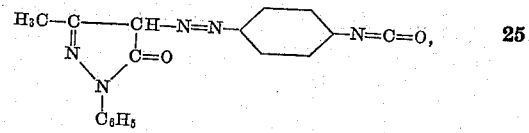

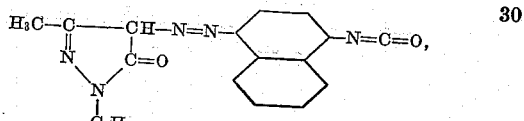

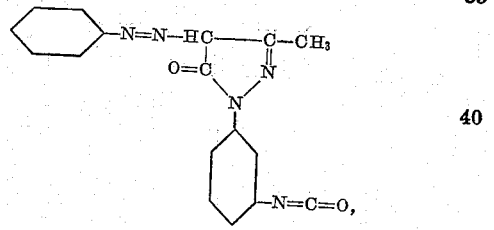

As amines suitable for our process there may be mentioned by way of example, alkylamines, such as methylamine, ethylamine, propylamine, butylamine, isobutylamine, benzylamine, etc., dialkylamines, such as dimethylamine, diethylamine, methyl-ethyl-amine, dipropylamine, diethanolamine, ethylpropyl-amine, etc., arylamines, such as aniline, naphthylamine, aminocarbazol, aminoanthraquinone, etc., alkylarylamines, such as methylaniline, ethylaniline, N-methyl-naphthylamine, N-ethyl-naphthylamine, or their substitution products, e. g. alkyl-, halogen-, hydroxy-, alkoxy-derivatives or sulfonic acids or carboxylic acids thereof.

The process of our invention proceeds according to the following equation:

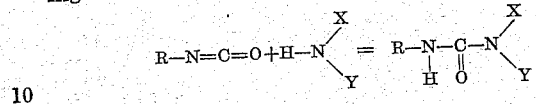

wherein "R", "X" and "Y" are to be defined as stated above.

Our new products are, when free from a free sulfonic or carboxylic acid well crystallizing, yellow to brownish substances, soluble in the usual organic solvents, those containing a free sulfonic or carboxylic acid group forming yellow to brown powders soluble in dilute aqueous alkalies. They are either dyestuffs themselves or are valuable intermediates for the manufacture of dyestuffs.

The invention is illustrated by the following examples but is not restricted thereto:

Example 1.—223 parts of phenylazophenylisocyanate are dissolved in benzene and slowly added to a neutral aqueous solution of 365 parts of the sodium salt of 1,8-aminonaphthol-3,6-disulfonic acid. After having been stirred for some hours the mass is filtered and the urea of the formula:

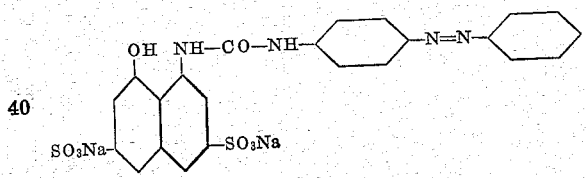

is precipitated with the aid of common salt, filtered off and dried. The urea is in the form of its sodium salt soluble in water with a yellow coloration; by the addition of an acid a reddish-brown precipitate is obtained.

Similar products are obtained on starting e. g. from the 4(4'-methoxyphenylazo) 3-methylphenyl-isocyanate of the formula

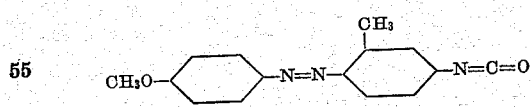

or from the isocyanate of the formula

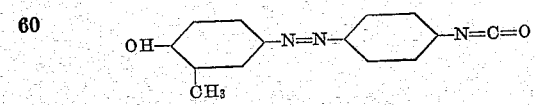

Instead of the 1,8-aminonaphthol-3,6-disulfonic acid other amino-naphthol sulfonic acids can be used, e. g. the 1,8-aminonaphthol-4,6-di- or 6-monosulfonic acid, the 2,5-aminonaphthol-7-sulfonic acid, the 2,8-aminonaphthol-6-sulfonic acid, or aminonaphthalene-sulfonic acids etc.

Example 2.—To a benzene solution of 301 parts of the isocyanate of the aminoazo compound from diazotized 2-chloroaniline and 3-amino-4-cresol-methylether 93 parts of aniline are added and heated for one hour on the water-bath. The resulting urea separates after a short time. It has the formula

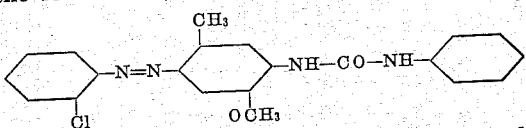

and crystallizes from benzine in the shape of reddish brown needles melting at 204° C. On starting from the isocyanate from the saponified aminoazo compound obtained from diazotized 4-aminoacetanilide and 1-phenyl-3-methyl-5-pyrazolone, a urea is obtained in the form of leaflets melting at 235° C. having the formula

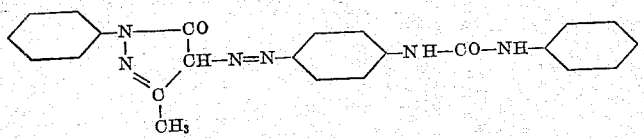

The aniline can be replaced by other amines, e. g. by naphthylamines, toluidines, chloroaniline, nitroanilines, aminophenols, anisidines and aminoazo-compounds.

Example 3.—31.9 parts of the isocyanate of 4-aminophenyl-1,4'-azo-1'-phenyl-3'-methyl-5'-pyrazolone of the formula

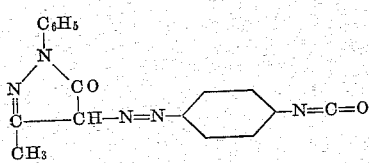

are dissolved in benzene and are heated on the water bath for one hour to 60° C. with 50 parts of concentrated ammonia whilst stirring. The precipitated dye is filtered with suction and crystallized from alcohol. It separates in the shape of yellow crystals melting at 258° C. They are soluble with difficulty in benzene and cold alcohol, easily soluble in glacial acetic acid and in hot spirit.

Example 4.—223 parts of the isocyanate prepared from 4-amino-azobenzene are heated while stirring with 107 parts of monomethylaniline for about ½ hour in an oil bath having a temperature of 140° C. After cooling, the solidified mass is dissolved in benzene and filtered; from the filtrate the urea of the formula

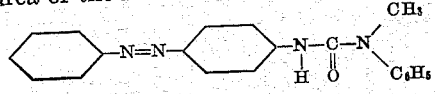

crystallizes.

We claim:
1. The process which comprises causing an isocyanate of an aminoazo-compound free from a free sulfonic or carboxylic acid group to act upon a compound of the group consisting of ammonia, primary amines of the aliphatic or aromatic series and secondary amines of the aliphatic, aromatic and aliphatic-aromatic series in a solvent at a temperature between about 30 and about 100° C.

2. The process which comprises causing an isocyanate of an aminoazo-compound which may be substituted in the nuclei by substituents selected from the group consisting of alkyl, hydroxyalkyl, halogen, the hydroxy group, an alkoxy group, the nitro group or an esterified carboxylic acid group, to act upon a compound of the group consisting of ammonia, primary amines of the aliphatic or aromatic series and secondary amines of the aliphatic, aromatic and aliphatic-aromatic series in a solvent at a temperature between about 30 and about 100° C.

3. The process which comprises causing an isocyanate of the general formula:

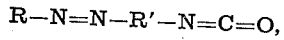

wherein R and R' stand for radicals of the benzene or naphthalene series which may be substituted by substituents selected from the group consisting of alkyl, hydroxyalkyl, halogen, the hydroxy group, an alkoxy group, the nitro group or an esterified carboxylic acid group, to act upon a compound of the group consisting of ammonia, primary amines of the aliphatic or aromatic series and secondary amines of the aliphatic, aromatic and aliphatic-aromatic series, in a solvent at a temperature between about 30 and about 100° C.

4. The process which comprises causing an isocyanate of the general formula:

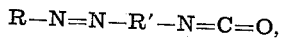

wherein R and R' stand for radicals of the benzene or naphthalene series which may be substituted by substituents selected from the group consisting of alkyl, hydroxyalkyl, halogen, the hydroxy group, an alkoxy group, the nitro group or an esterified carboxylic acid group, to act upon aminonaphthol-sulfonic acid in aqueous solution at a temperature between about 30 and about 100° C.

5. The process which comprises causing about molecular proportions of phenylazophenyl-isocyanate and 1,8-aminonaphthol-3,6-disulfonic acid to act upon each other in a neutral aqueous medium.

6. Asymmetrical ureas of the general formula:

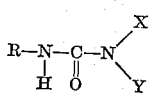

wherein R stands for the radical of an aminoazo-compound free from a free carboxylic acid or a free sulfonic acid group, X stands for hydrogen or alkyl and Y stands for an amino-naphthol-sulfonic acid radical, forming well crystallizing, yellow to brown substances and being valuable intermediate products for the manufacture of dyestuffs.

7. Asymmetrical ureas of the general formula:

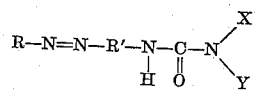

wherein R and R' stand for radicals of the benzene or naphthalene series which may be substituted by substituents selected from the group consisting of alkyl, hydroxyalkyl, halogen, the hydroxy group, an alkoxy group, the nitro group or an esterified carboxylic acid group, X stands for hydrogen or alkyl and Y stands for an amino-naphthol-sulfonic acid radical, forming well crystallizing, yellow to brown substances and being valuable intermediate products for the manufacture of dyestuffs.

8. The urea of the following formula:

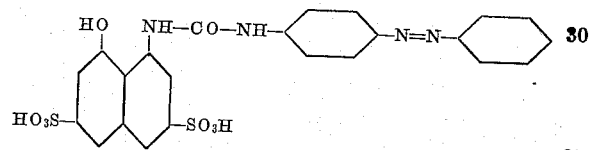

being a well crystallizing, reddish-brown substance and being a valuable intermediate product for the manufacture of dyestuffs.

JOSEF HILGER.
CARL TAUBE.